Figure 1:
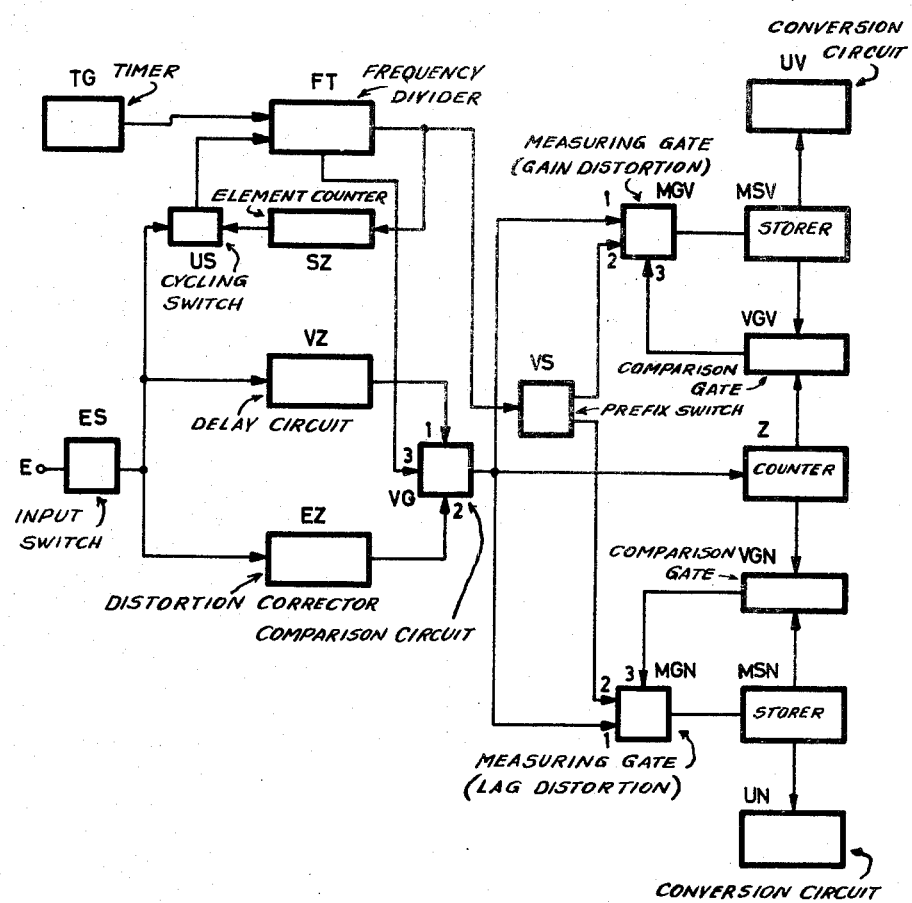

United States Patent Office 3,182,127
Patented May 4, 1965

3,182,127
MEASURING REFERENCE DISTORTION OF TELEGRAPH SYMBOLS IN START-STOP TELEGRAPH OPERATION
Otto Wiese, Munich, Germany, assignor to Siemens & Halske Aktiengesellschaft Berlin and Munich, a corporation of Germany
Filed Aug. 28, 1961, Ser. No. 134,194
Claims priority, application Germany, Sept. 7, 1960, S 70,249
9 Claims. (Cl. 178—69)

This invention is concerned with measuring reference distortion of telegraph symbols in start-stop telegraph operation.

In the transmission of telegraph symbols according to the start-stop principle, there occur distortions as a result of timing fluctuations and other disturbances. The shifting in time between the desired element change-over instants derived from the appearance of the start element, and the actual element change-over instants, referred to a desired element duration or length, produces the so-called reference distortion. This reference distortion can assume positive as well as negative values, depending upon whether the actual element change-over instants arrive, as compared with the desired element change-over instants, too late or too early. If they arrive too early, the resulting distortion is termed gaining reference distortion, and if the arrive too late, it is termed lagging reference distortion.

In known circuits for measuring the reference distortion of telegraph symbols transmitted according to the start-stop principle, the actual element changes of the telegraph symbols, which are to be measured, are compared with desired element change-over instants derived from a timing circuit with reference to the instant of appearance of the start element. The actual element change-over instants are, together with the desired element change-over instants, generally made visible upon an oscillograph screen.

There are however also reference distortion measuring devices known which provide a visual indication without the use of oscillagroph tubes. In one of the known measuring devices of this kind, the entire range of the possible reference distortion is subdivided into individual distortion stages. The comparison instants required for the distortion stages are thereby obtained, by coincidence action, from a counter which is operatively switched in response to the appearance of a start element and which counts timing pulses appearing at a higher frequence. A glow lamp for each distortion stage is provided in a calibrated glow lamp field or board. When an element change occurs in one of these distortion stages, the respective glow lamp will light and thereby deliver a visual numerical indication.

The present invention proposes a new measuring principle for measuring reference distortions of telegraph symbols transmitted in start-stop operation. A known distortion corrector may be used which samples and transmits the polarity of the telegraph symbols to be measured, such sampling always taking place at the center of the desired element, referred to the appearance of the start element. In accordance with the invention, the telegraph symbols which are to be measured are in a delay circuit delayed by one-half of the desired element length and conducted to one input of a comparison circuit, the other input of which is connected with the output of the distortion corrector. The spacing in time between mutually corresponding element changes, at the inputs of the comparison circuit, is measured and evaluated as a criterion for the distortion.

In an advantageous embodiment, the comparison circuit is, during the time interval between two mutually corresponding element changes, caused by the distortion, made conductive for counting pulses of a defined sequence frequence always present at a further input, and the pulses which pass through the comparison circuit between mutually corresponding desired element changes are conducted to a counter and evaluated as a measure for the amount of distortion. The counter is in the element center of the corrected symbol elements always reset to initial position, so as to assure that a number of pulses is always conducted thereto corresponding to the amount of distortion of the individual symbol elements.

A prefix switch is advantageously provided for distinguishing between gaining and lagging distortion, and such switch is always switched over in a spacing of one-half desired element length.

It is, in connection with many measurements, of interest to ascertain the maximum reference distortion value occurring during a given measuring time. In accordance with another advantageous feature, the counter content is for this purpose, depending upon the prefix of the distortion, stored in a measuring value storer for gaining distortion, or in a measuring storer for lagging distortion, only when the counter content exceeds the value stored in the respective measuring storer. The result is that only the maximum values of the distortions occurring in a given measuring period are stored in the respective measuring value storers. The binary distortion values stored in the measuring value storers are by means of decoding devices advantageously transformed into decimal representation and are by means of an illuminated number panel suitably signalled or recorded.

The counters and the measuring value storers, preferably have an initial or normal position other than zero, so as to always obtain from a symbol sequence a measure of the absolute maximum distortion independent of residual errors.

All comparison instances as well as the counting pulses can be advantageously derived from a counting chain, the operation of which starts from an initial position, responsive to the start of each telegraph symbol, such counting chain counting the impulses of a timing pulse with small impulse spacing with respect to the length of the telegraph elements.

The entire circuit can be advantageously constructed with the aid of transistors and magnetic cores with approximately rectangular hysteresis loop.

The foregoing and further details, objects and features of the invention will appear in the course of the description which is rendered below with reference to the accompanying drawings.

Figure 2:
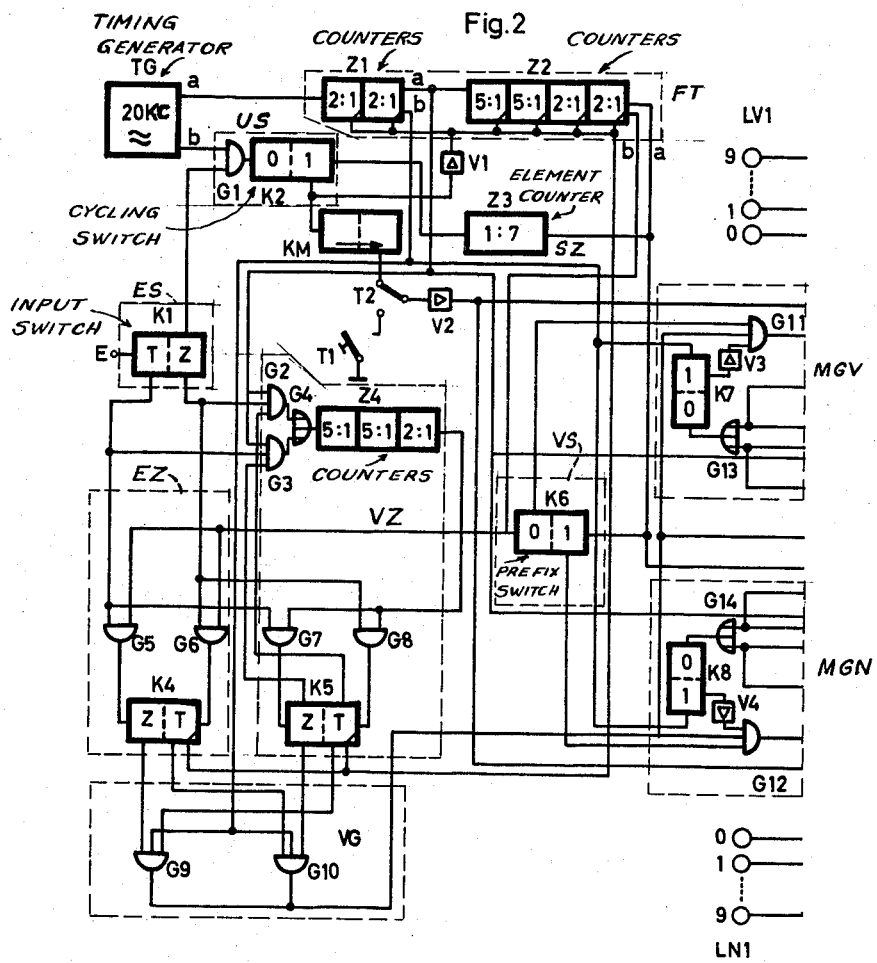
Figure 3:
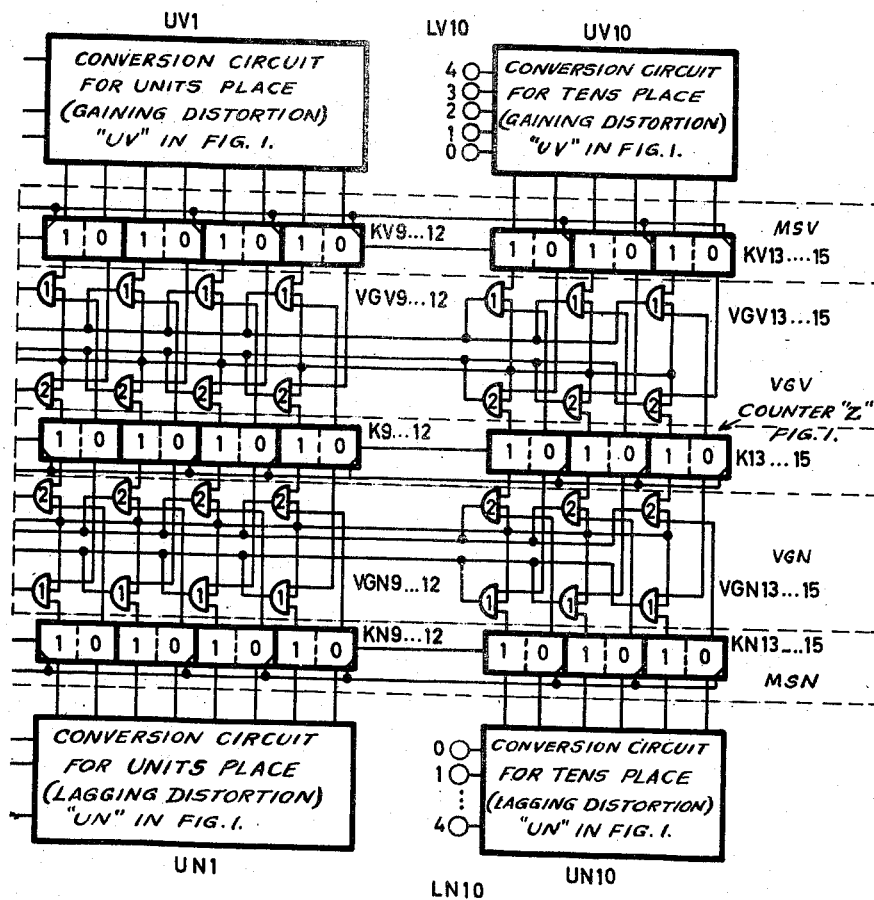

FIG. 1 shows in block diagram manner a circuit arrangement according to the invention; and FIGS. 2 and 3, placed side by side with corresponding conductors in alignment, show details thereof.

Referring now to FIG. 1, to the input E is conducted the distorted telegraph symbol sequence which is to be measured. The input switch ES is operable to steepen the zero passages. The cycling switch US is operatively released responsive to the receipt of a start element, thereby operatively releasing the frequency divider FT so as to condition the latter for responding to timing impulses of high sequence frequence coming from the timer TG. The distortion corrector EZ is by the start element at the same time operatively released, and supplies at its output to the input 2 of the comparison circuit VG, corrected telegraph symbols which are, due to the element center sampling, shifted by one-half desired element length as compared with the supplied telegraph symbols; the distorted telegraph symbol sequence is at the same time over the delay circuit VZ, which effects a delay of one-half desired element length, conducted to the input 1 of the comparison circuit VG. Accordingly, the appearance of the start element is at the same instant manifested at the inputs 1 and 2 of the comparison circuit VG, while the successive element starts are in accordance with the prevailing distortion mutually displaced as to time.

The comparison circuit VG is constructed so that it is, between mutually corresponding element changes, conductive for impulses derived from the frequency divider FT which are conducted to the input 3 thereof. The number of impulses appearing at the output of the comparison circuit is accordingly a measure for the respective distortion.

These output pulses are counted in the counter Z and are also conducted to the input 1 of the measuring value gate MGV for the gaining distortion and to the input 1 of the measuring value gate MGN for the lagging distortion. These two gates are over their inputs 2, during the measuring times for gaining and lagging distortion, respectively operatively prepared and blocked by the action of the prefix switch VS which is operatively controlled by the output pulses of the frequency divider FT, such pulses switching the prefix switch over after each half desired element length. The measuring gate MGV for gaining distortion controls the measuring value storer MSV for gaining distortion, and the measuring value gate MGN controls the measuring value storer MSN for the lagging distortion. The content of the counter Z and the values stored in the measuring value gates or stores MGV and MGN are respectively compared in the comparison gate VGV for gaining distortion and in the comparison gate VGN for the lagging distortion, since the number stored in the counter Z is to be transmitted in the respective measuring value storer only in case it is higher than the number already stored in the latter.

In case the counter content exceeds the value stored in the measuring value storer MGV (gaining distortion) or MGN (lagging distortion), the corresponding storer is made conductive by a signal connected to the input 3 thereof. The pulses which had been conducted from the comparison circuit VG to the input 1 of the respective measuring value gate, can now pass such gate and increase the value stored therein. Conversion circuits UV and UN, respectively for gaining and lagging distortion, are cooperatively associated with the corresponding measuring value storers, such circuits being operative to transpose the stored values, in decimal representation, for indication, for example, on an illuminated number panel.

The output pulses from the frequency divider FT are also conducted to the element counter SZ, such counter being during the stop element of the measured telegraph symbol operative to transmit an impulse to the cycling switch US, thereby causing restoration or resetting of the latter to its initial or normal position and also effecting blocking of the frequency divider.

The measuring value stores or gates can be restored to normal position by singles conducted thereto over suitable, not illustrated, reset lines.

The structure of the circuit according to the block diagram of FIG. 1 will now be described more in detail with reference to FIGS. 2 and 3. It is thereby assumed that the telegraph speed amounts to 50 baud and that the teleprinter code used is the normal 5-element code. All impulses occurring have positive polarity. The trigger or switching stages are constructed as pnp transistor switching stages, that is, a transistor triggered by impulses is blocked or placed at cutoff. The various elements are illustrated in the normal or resting position of the circuit.

The distorted telegraph symbols which are to be measured are conducted to the input E. The start element of a telegraph symbol is operative to switch the input switch stage K1 (corresponding to the input switch ES of FIG. 1) from the space current position T to the mark current position Z, thereby operatively affecting one input of the coincidence gate G1. The other input of this coincidence gate is connected with the timing generator TG which delivers short pulses with a sequence frequence of 20 kilocycles in two phase positions $a$ and $b$ which are displaced by 180°. The first timing pulse of the pulse phase $b$, occurring after the switching over of the input switch K1, switches the circuit K2 (corresponding to the cycling switch US in FIG. 1) into the "1" position, thereby cancelling over the amplifier V1 the resetting for the counters Z1 and Z2 as well as the switching stages K4 and K5. The next following timing pulses of the timing phase $a$ can now become effective. The ratio numbers entered in connection with the counters Z1 to Z4 indicate the division ratios of the individual stages. Accordingly, the counter Z1 divides in a ratio of 4:1, so that a timing frequency of 5 kilocycles can be taken off at its output, with the two timing phases $a$ and $b$. The counter Z2 has a total division ratio of 100:1 and at its output is therefore obtained, with the timing phases $a$ and $b$, a timing frequency of 50 kilocycles. It follows, therefore, that the spacing of the individual pulses of a timing phase at the output of the counter Z2 corresponds exactly to the desired or actual length of an element. The first output pulse of the counter Z2, of the timing phase $b$ appears 10 milliseconds after the inception of the start step, and the first timing pulse of the timing phase $a$ appears 20 milliseconds thereafter. The next following timing pulses of a timing phase exhibit respective a spacing of 20 milliseconds.

The input switching stage K1 triggers an input of the coincidence gates G5 and G6, respectively. To the other input of the respective gates are conducted the output pulses of the counter Z2 with the timing phase $b$. Accordingly, the output switching stage K4 assumes the condition of the input switching stage K1, always at the actual element center instants as measured from the inception of the start element. This results in a delay of 10 milliseconds or one half of the actual element length.

The two outputs of the switching stage K1 are respectively connected each with an input of the coincidence gates G2 and G3. To another input of each of these coincidence gates are conducted the output pulses of the counter Z1, with the timing phase $a$. The third inputs of these concidence gates are respectively connected, each with an output of the switching stage K5. The outputs of the coincidence gates G2 and G3 are combined over a mixing gate G4 and connected with the input of the counter Z4 which has a total division ratio of 50:1. The output of the counter Z4 is connected with inputs of the coincidence gates G7 and G8. The other inputs of these two coincidence gates are likewise triggered from the input switching stage K1.

As noted before, both the input switching stage K1 and the switching stage K5 are in normal or resting condition in the space current position. The coincidence gates G2 and G3 are in such situation at cutoff since one of the inputs thereof receive space current polarity or potential while another input receives mark current potential. When the input switching stage K1 switches over as described, responsive to a start element, into its position Z, either the coincidence gate G2 or the coincidence gate G3, depending on the polarity, will become conductive for the output pulses of the phase $a$ of the counter Z1, conducted to the third input of the respective gate. After 10 milliseconds or one-half actual element length, the counter Z4 gives off an output pulse to the coincidence gates G7 and G8, thus making it possible that the switching stage K5 can at this instant assume the position of the input switching stage K1. The coincidence gates G2 and G3 are again placed at cutoff responsive to the switching over of the switching stage K5. Accordingly, the last explained arrangement causes the switching stage K5 to always assume, after one-half actual element length, the polarity of the input switching stage K1.

The outputs of the switching stages K4 and K5 are linked with the inputs of the coincidence gates G9 and G10 in such a manner, that one of these coincidence gates is placed in preparatory position when the switching stages K4 and K5 exhibit different positions. The instants at which this occurs correspond however, as is apparent from the preceding explanations, to the prevailing distortion. The output pulses of the timing phase b of the counter Z1, which are at the third inputs of the respective coincidence gates G9 and G10, can during these intervals pass through one of these gates. Accordingly, the number of impulses passing through, is a measure or criterion for the prevailing distortion, and since these impulses have a sequence frequence of 5 kilocycles, each impulse will correspond to a distortion value of 1 percent.

The impulses passed by the respective coincidence gate G9 or G10 lie at an input of the coincidence gate G11 and G12 and at the input of the switching stage K9. This switching stage K9 forms together with further switching stages K10 to K15, the counter Z indicated in FIG. 1. This counter has, for reasons to be presently explained, a normal position corresponding to the distortion value of 1 percent. The switching stages K9 to K12 serve for the formation of the units places and the switching stages K13 to K15 serve for the formation of tens places of the distortion value which is to be indicated. For example, when ten impulses are passed by the coincidence gates G9 and G10, the switching stages K9 and K15 will assume positions corresponding to the decimal number 11, corresponding to a distortion value of 11 percent.

A prefix switching stage K6, corresponding to the prefix switch VS of FIG. 1, is provided so as to distinguish between gaining and lagging distortion. This switching stage is switched into the "1" position by the output pulses of the timing phase b of the counter Z2 while being switched into the "0" position by the output pulses of the timing phase a, that is, the position thereof is changed in a spacing of 10 milliseconds or one-half of an actual element length. This switching over of one-half actual element length corresponds to the measuring times for gaining and lagging distortion, respectively. The switching stage K6 prepares in its "0" position an input of the coincidence gate G11 while preparing in its "1" position an input of the coincidence gate G12.

To the coincidence gate G11 is allotted a measuring value storer for gaining distortion, comprising the switching stages KV9 to KV15, and to the coincidence gate G12 is allotted a similar storer, for lagging distortion, comprising the switching stages KN9 to KN15 corresponding to the measuring valve storer MSV of FIG. 1. The counter content and the values stored in the measuring value storers must be compared, since a new distortion value is to be stored in the measuring value storer only when the value stored in the counter, comprising the switching stages K9 to K15, is higher. This is effected with the aid of a comparison gate circuit for gaining distortion, comprising the comparison gates VGV9 to VGV15, corresponding to the comparison gate VGV of FIG. 1, and a comparison gate circuit for lagging distortion, comprising the comparison gates VGN9 to VGN15, corresponding to the comparison gate VGN of FIG. 1, such comparison being carried out as follows:

It shall first be assumed that the counter and the measuring value storer for gaining distortion are in initial position, that is, that the same value of 1 percent is stored in both. In such case, all coincidence gates VGV9 to VGV15 of the comparison gate circuit for gaining distortion will be at cutoff, and the output pulses of the counter Z1, with the timing phase a, cannot pass through any one of these coincidence gates. Accordingly, the control switch K7 is by the action of the output pulses of the counter Z1, with the timing phase b, held in the "0" position, and the third input of the coincidence gate G11 is triggered over the amplifier V3. In the event that there should now occur a gaining distortion of a space current element, amounting to 10 percent, making the coincidence gate K9 conductive for ten impulses, these impulses will reach the counter (switching stages K9 to K15) and over the conductive coincidence gate G11 also to the measuring value storer for gaining distortion (switching stages KV9 to KV15). Since the values to be compared are identical, due to the simultaneous storing thereof in the counter and in the measuring value storer, all coincidence gates VGV9 to VGV15 of the comparison gate circuit for gaining distortion, remain at cutoff and the control circuit K7 remains in the "0" position.

In the event that a lower gaining distortion value should now appear, for example, 5 percent, five impulses which pass through the coincidence gate G9 will be extended to the counter, which had been reset to its initial position, in the element center of the corrected symbol, by an output impulse of the counter Z2, in the timing phase a. Since the counter content now differs from the value stored in the measuring value storer for gaining distortion some predetermined gates of the comparison gate circuit for gaining distortion are now conductive, and the output impulses of the counter Z1 are, with the timing phase a extended over these coincidence gates and the mixing gate G13, to the control switch K7, causing such switch to assume the "1" position. Accordingly, so long as the two values which are to be compared, are different, and so long as impulses pass through the coincidence gate G9, the control switch K7 will be alternately placed into the "1" position, by the output pulses of the counter Z1, with the timing phase a, and in the "0" position by the output pulses of such counter, with the timing phase b. Since the impulses passing through the gate G9 coincide with the impulses given off by the counter Z1, with the timing phase b, the amplifier V3 must operate with a given delay so as to avoid in such cases a spurious coincidence at the coincidence gate G11. This coincidence gate is in such case accordingly at cutoff, and the value stored in the measuring value storer for gaining distortion is preserved.

In case there now appears a gaining distortion value of 15 percent, the coincidence gate G11 will be blocked or at cutoff for the first ten impulses passed through the coincidence gate G9, since the counter content is up to the tenth impulse different from the value stored in the measuring value storer for gaining distortion. However, the two values will be identical when the tenth impulse reaches the counter, and the coincidence gate G11 will become conductive in the manner described before. The remaining five impulses passed through the coincidence gate G9 are accordingly stored in the counter and also in the measuring value storer for gaining distortion, in the manner explained before.

The outputs of the switching stages of the measuring value storer for gaining distortion are connected with the conversion circuits UV1 and UV10, serving respectively for the conversion of the units place and of the tens place. The values obtained are signalled or indicated by means of illuminated number fields or panels respectively shown at LV1 and LV10.

The measuring value storer for lagging distortion and the conversion circuits UN1 and UN10 cooperatively associated therewith and provided with illuminated number panels LN1 and LN10, are constructed in similar manner.

At the conclusion of each telegraph symbol, the element counter Z3, which has a counting capacity of 7 corresponding to the element number 7, gives off an output pulse to the cycling switch K2 to reset the latter to the "0" position. This effects over the amplifier V1 the resetting of the counters Z1 and Z2 as well as of the switching stages K4 and K5.

The cycling switch K2 is at the start of the measuring operative to switch in the monostable switching stage KM, the latter switching after a given time, corresponding to a measuring interval or period, into the normal or resting position, thereby effecting over the contact T2 and amplifier V2 resetting of the individual switching stages of the measurement value storers to initial position. This resetting can be accomplished independently of the monostable switching stage KM by actuating contact T1 to transmit the reset signal over the contact T2 which is for this purpose placed into alternate position.

As has been noted before, the counter and also the two measuring value storers may have an initial position which differs from zero. Therefore, in accordance with the staging of 1 percent, as assumed in the described embodiment, a binary number corresponding to the decimal number 01 is stored in the counter as well as in the measuring value storer in the initial or normal position thereof. The result thereby obtained is, that even with consideration of the residual error, there will always be stored and indicated the highest distortion value occurring in a measuring cycle.

The entire circuit can be advantageously constructed with the aid of transistors and magnetic cores with approximately rectangular hysteresis loop. The counters Z1 to Z4 can be constructed with the aid of counting cores, since they need not supply any intermediate time intervals. Magnetic ring core counters are in such case provided to form the timing phases $a$ and $b$.

It is of course understood that the circuit may also be constructed utilizing different techniques, for example, electronic tube components.

Changes may be made within the scope and spirit of the appended claims which define what is believed to be new and desired to have protected by Letters Patent.

I claim:

1. A circuit arrangement for measuring the reference distortion of telegraphic symbols which are transmitted in accordance with the start-stop principle, comprising distortion corrector means for sampling the polarity of telegraphic symbols to be measured at the center of the elements involved, referred to the inception of the start element and for correcting such symbols, delay means operable to delay an uncorrected symbol by one-half element length, each of said corrector and delay means having an input and an output, means for operatively conducting a received symbol to both of said inputs, a time measuring device comprising a timing impulse generator operable to produce timing impulses having a high frequency as compared with the element frequency of the telegraphic symbols, a comparison circuit having an output and respective inputs, the outputs of said corrector and delay means each being operatively connected to a respective input of said comparison circuit, said impulse generator being operably connected to said comparison circuit, the latter circuit being operative, responsive to element changes of the distortion-corrected symbol and the uncorrected symbol appearing at the inputs of said circuit, to control the passage therethrough of impulses from said generator, which impulses constitute a criterion for the degree of distortion.

2. A circuit arrangement as defined in claim 1, comprising a counting device operatively connected to the output of said comparison circuit, operative to count the timing impulses conducted over the comparison circuit, in which the counting result directly constitutes a criterion for the degree of distortion.

3. A circuit arrangement as defined in claim 2, comprising means connected with said counting device for resetting the latter to initial position at the element center of the corrected symbol.

4. A circuit arrangement as defined in claim 3, comprising a measuring value storer for gaining distortion and a measuring value storer for lagging distortion, a prefix switch for respectively segregating gaining and lagging distortion, means for effecting switching over of said prefix switch in a spacing of one-half desired element length, and means responsive to the prefix character of the distortion, as determined by said prefix switch, to effect a storing of the counting device content in the respective measuring value storer only if such count exceeds the value stored in the corresponding value storer.

5. A circuit arrangement as defined in claim 4, comprising a first and a second gate circuit allotted to each measuring value storer, said first gate circuit having a first input for receiving the impulses passed through said comparison circuit, and having a second input operatively connected to said prefix switch and which is triggered incident to gaining or lagging distortion, respectively, and having a third input, said second gate circuit having an input operatively connected to said counting device and an output which is connected with the third input of the respective first gate circuit, said third input being triggered upon determination, by the action of said second gate circuit, that the counter content exceeds the value stored in the respective measuring value storer.

6. A circuit arrangement as defined in claim 5, comprising means connected to the respective measuring value storers forming conversion circuits for transforming the binary distortion values stored in the respective measuring value storers into decimal representation, and means for suitably signalling said decimal representation of the distortion values.

7. A circuit arrangement as defined in claim 6, wherein said measurement value stores are provided with a normal position differing from zero.

8. A circuit arrangement as defined in claim 5, wherein said delay means comprises a further gate circuit, said further gate circuit becoming, incident to each change of polarity of the telegraph symbols to be measured, conductive for impulses derived from said generator, a frequency divider having an input for receiving the latter impulses, coincidence gate means connected for the reception of the telegraph symbols which are to be measured and prepared for operation thereby, said coincidence gate means being connected to said further gate circuit, said frequency divider being after a given number of impulses corresponding to one-half desired element length effective to extend an output impulse to said prepared coincidence gates, whereby said further gate circuit is placed on cutoff.

9. A circuit arrangement as defined in claim 8, wherein said time generating device includes means forming a counting chain the counting operation of which is initiated from a normal position responsive to the start of each telegraph symbol, said counting chain counting with small pulse spacing with respect to the length of the symbol elements the impulses of a timing pulse, and means for deriving all comparison times and the counting impulses from said counting chain.

References Cited by the Examiner

UNITED STATES PATENTS 2,856,457 10/58 Prior et al. _____ 178—69
2,961,489 11/60 Carver _____ 178—69
3,036,290 5/62 Zarouni _____ 178—69

NEIL C. READ, *Primary Examiner.*

ELI J. SAX, ROBERT H. ROSE, *Examiners.*